Feb. 3, 1931. J. LIEN 1,791,365
SELF CLEANING, NONCLOGGING, TRAVELING GRIZZLY
Filed July 18, 1929
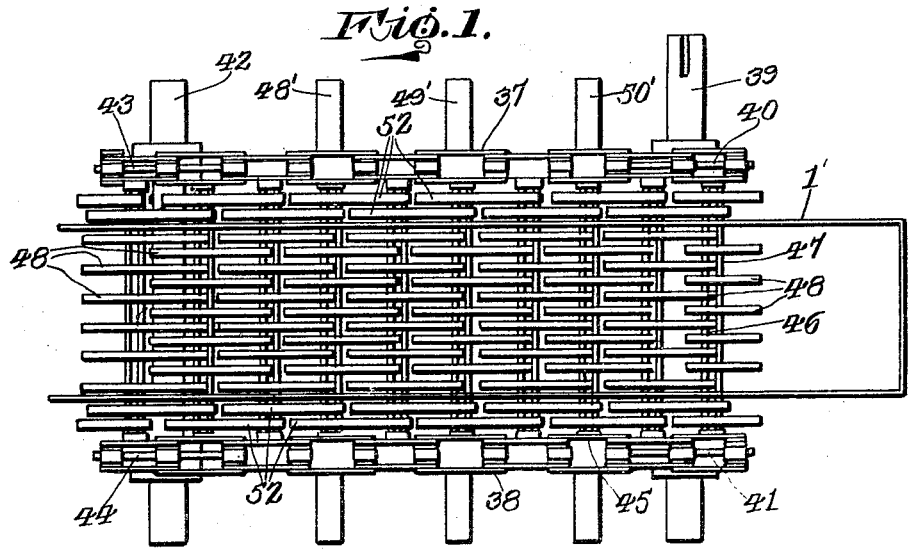
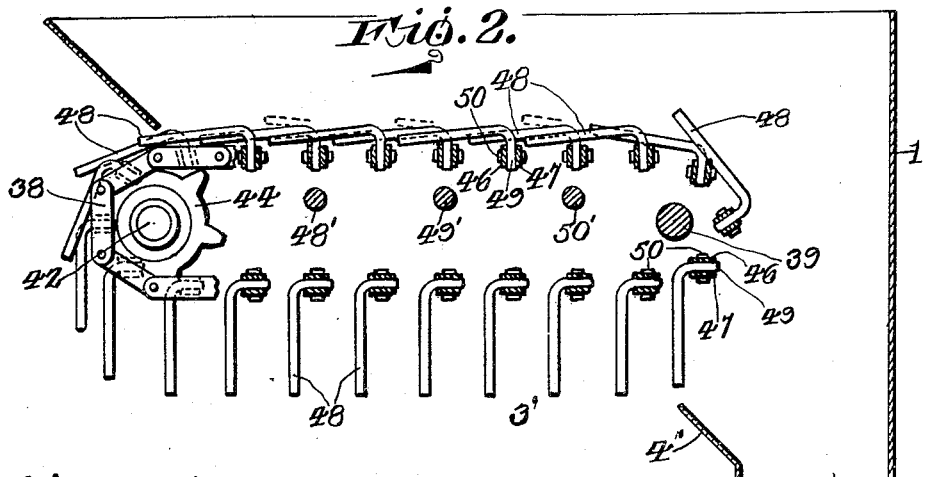
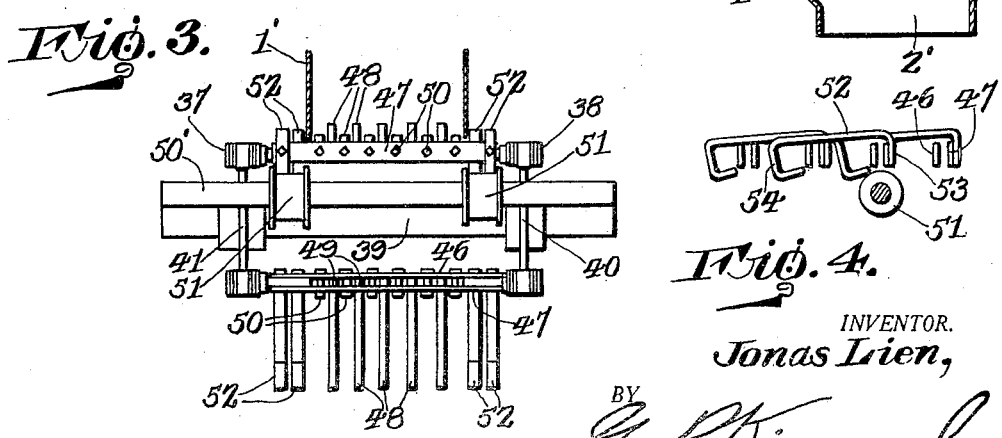
INVENTOR.
Jonas Lien,
BY
Geo. F. Kimmel
ATTORNEY.

Patented Feb. 3, 1931

1,791,365

UNITED STATES PATENT OFFICE

JONAS LIEN, OF PORT WASHINGTON, NEW YORK

SELF-CLEANING, NONCLOGGING, TRAVELING GRIZZLY

Application filed July 18, 1929. Serial No. 379,257.

This invention relates to a self-cleaning, non-clogging, traveling grizzly designed primarily for the screening and conveying of coal, but it is to be understood that a grizzly, in accordance with this invention may be employed in any connection for which it is found applicable, such as screening and conveying coke, stone, gravel, clay, grain or any other materials subject to screening, sizing or separation, and the invention has for its object to provide, in a manner as hereinafter set forth, a traveling grizzly so constructed and arranged to prevent, when active, the clogging thereof whereby the screening of the material is carried on without stoppage of the grizzly, under such conditions resulting in expeditious screening and conveying operations with a material saving in time, labor and upkeep.

Further objects of the invention are to provide, in a manner as hereinafter set forth, a self-cleaning, non-clogging, traveling grizzly which is simple in its construction and arrangement, strong, durable, thoroughly efficient in its use, readily assembled and comparatively inexpensive to set up.

With the foregoing and other objects in view the invention consists of the novel construction, combination and arrangement of parts as hereinafter more specifically described, and illustrated in the accompanying drawings, wherein is shown embodiments of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a traveling grizzly in accordance with this invention.

Figure 2 is a fragmentary view in side elevation and partly in section of a traveling grizzly in accordance with this invention.

Figure 3 is a fragmentary view in elevation looking towards the discharge end of the grizzly.

Figure 4 is a side elevation of the elevating element for the screen or grate bars or fingers.

The grizzly includes an endless, traveling, combined screening and conveyor element of any desired length and formed from any desired number of sets of screen or grate bars arranged in spaced relation, and with the number of the bars of each set depending upon the width desired of the combined screening and conveyor element. The bars of one set are alternately disposed with respect to the bars of adjacent sets.

The combined screening and conveyor element is adapted to be positioned within a hopper 1' having a discharge 2' for the screened material and a discharge 3' for the screenings and with the discharge 2' spaced from the discharge 3' by a partition 4'. The material to be screened or separated is supplied to the hopper 1' and the screenings pass through the combined screening and conveyor element and are conducted off through the discharge 3'.

The sets of screen or grate bars upon which the material to be screened is deposited provide what may be termed agitators and have an upward movement imparted thereto and a downward movement by gravity whereby such movements will expedite the screening and prevent the clogging of the grizzly when the latter is active. The screen or grate bars of one set extend between the bars of an adjacent set, but the grate bars of each set are elevated simultaneously and lowered by gravity simultaneously. The screen or grate bars act to agitate the material, not only that which is deposited upon such set but also that which is deposited upon a rear set. The upward and lowering movements of the screen or grate bars of the sets expedite the screening and prevent the grizzly from clogging.

In the form shown a pair of spaced, opposed, endless chains of the link type are employed and which are indicated at 37, 38. The reference character 39 indicates a drive shaft which is arranged at the forward end of the grizzly and it is provided with a pair of sprocket wheels 40, 41 which engage the links of the chains 37, 38 for imparting movement thereto. At the rear of the grizzly a pair of shafts 42 is arranged and which is provided with a pair of sprocket wheels 43, 44 engaging the links of the chains.

The belts are set up from a series of pivotally connected pairs of links and the inner link of each pair is indicated at 45. The links of each pair are arranged in parallel, spaced relation. The ends of one pair of links are pivotally connected to the ends of the adjacent pairs of links. The inner links of belt or chain 37 oppose and are in alignment with the inner links of the belt or chain 38.

Each pair of opposed links 45, on the inner faces thereof has pivotally supported thereby the ends of a pair of spaced, parallel rods 46, 47. To each pair of rods is rigidly secured a set of spaced, parallel screen or grate bars and which are inclined rearwardly with respect to the rods at the upper stretch of the grizzly.

Each screen or grate bar can be of any suitable form preferably of L-shaped contour and as shown includes a longitudinal leg 48 and a vertical leg 49 which is of materially less length than the leg 48. The leg 49 is extended between a pair of rods 46, 47 and is fixedly secured thereto by a holdfast means 50. The leg 49 projects a short distance from the rods to space the legs 48 from the latter. The holdfast means 50 also connects the pair of rods together so that they will pivot in unison and in the same direction. It is to be understood that each set of grate bars may be secured to a solid shaft instead of to the rods 46, 47. The solid shafts are adapted to be secured to the links of the chains in the same manner that the rods 46, 47 are secured to the links. The set of forward bars is alternately disposed with respect to a set of rear bars and the bars of a forward set extend between the bars of a rear set. See Figure 1.

The shafts 39 and 42 can be supported in any suitable manner, as well as a series of spaced, parallel supporting shafts 48′, 49′ and 50′ positioned in close proximity to the upper stretch of the combined screening and conveying element provided by the screen or grate bars, endless chains and rods 46, 47. The shafts 48′, 49′ and 50′ are arranged between shafts 39 and 42. Revolubly mounted on each shaft 48′, 49′ and 50′ is a pair of flanged abutment members 51 positioned in proximity to, but below the chains or belts 37, 38. The abutment members are arranged in the path of the lifting arms 48 for the sets of screen or grate bars.

A pair of lifting arms 48 associated with each set of screen or grate bars are positioned at the sides of the set and arranged in proximity to the ends of a pair of rods 46 and 47. The lifting arms 48 are constructed from rod like material and bent to form an outer longitudinal part 52, an inwardly extending forward part 53 which is disposed substantially at right angles with respect to the part 52, and an L-shaped rear part 54 which extends forwardly at a slight inclination and is disposed at an angle with respect to the rear end of part 52. The part 53 is suitably secured to the forward side of the rod 47. The part 52 extends rearwardly from part 47 and is of a length to project rearwardly with respect to a pair of adjacent rods 46, 47.

The lifting arms for a forward set of screen or grate bars are arranged outwardly with respect to a rear set, or in other words the lifting arms at each side of the grizzly are arranged in a manner whereby the arms for every alternate set are arranged outwardly with respect to the arms for the other of the sets of the screen or grate bars. The pair of lifting arms for each set abut the members 51 and as the parts 54 of the lifting arms travel over said members 51 the set of screen or grate bars with which the pair of lifting arms is associated will be elevated. The lifting arms during their travel will clear the rods 46 and 47. The abutment members 51 function to elevate the screen or grate bars to the dotted line position shown in Figure 6. The screen or grate bars assume their normal or lowered position by gravity. The elevating of the screen or grate bars provides for agitating the material, thereby expediting the screening operation and further prevents the clogging of the grizzly during the travel of the endless, combined screen and conveying element. The rods 46, 47 are so mounted that they can pivot so that the screen or grate bars on the lower stretch of the combined screening and conveying element will assume the vertical position as shown in Figure 6 whereby the screenings will quickly pass through the grizzly to the discharge point 3 of the hopper. The hopper will be provided with suitable openings to provide a clearance for the operation of the combined screening and conveying element. The elevating arms for the sets of screen or grate bars are arranged exteriorly with respect to the sides of the hopper 1′.

It is thought the many advantages of a grizzly, in accordance with this invention and for the purpose set forth can be readily understood, particularly in view of the fact that the construction provides a self-cleaning, non-clogging, traveling grizzly, and although the preferred embodiments of the invention are as illustrated and described, yet it is to be understood that changes in the details of construction can be had which fall within the scope of the invention as claimed.

What I claim is:

1. A grizzly comprising an endless, combined screening and conveying element including simultaneously traveling sets of spaced screen bars, the bars of one set being alternately disposed with respect to the bars of an adjacent set, the bars of a forward set extending between the bars of a rear set at the upper stretch of said element, lifting arms carried by and at the sides of each set, and means coacting with said arms for elevating the bars of the sets arranged at the upper stretch of said element on the forward travel of said stretch.

2. A grizzly comprising an endless, combined screening and conveying element including simultaneously traveling sets of spaced screen bars, the bars of one set being alternately disposed with respect to the bars of an adjacent set, the bars of a forward set extending between the bars of a rear set at the upper stretch of said element, lifting arms carried by and at the sides of each set, means coacting with said arms elevating the bars of the sets arranged at the upper stretch of said element on the forward travel of said stretch, and means whereby the bars of the sets at the lower stretch of said element will swing to a vertical position as said lower stretch travels upwardly.

3. A grizzly comprising an endless, combined screening and conveying element having a forwardly traveling upper stretch, a rearwardly traveling lower stretch, a downwardly traveling forward end stretch and an upwardly traveling rear end stretch, said element including simultaneously traveling sets of pivotally supported, spaced screen bars movable to a horizontal position on the forward travel of the upper stretch and to a vertical position on the rearward travel of the lower stretch, lifting arms carried by and at the sides of each set, and means positioned in proximity to the upper stretch of said element and coacting with said arms for elevating the bars of a forward set in advance of the bars of a rear set as the bars move forwardly.

4. A grizzly comprising an endless, combined screening and conveying element having a forwardly traveling upper stretch, a rearwardly traveling lower stretch, a downwardly traveling forward end stretch and an upwardly traveling rear end stretch, said element including simultaneously traveling sets of pivotally supported, spaced screen bars movable to a horizontal position on the forward travel of the upper stretch and to a vertical position on the rearward travel of the lower stretch, lifting arms carried by and positioned at the sides of each set, and means positioned in proximity to the upper stretch of said element and coacting with said arms for elevating the bars of a forward set in advance of the bars of a rear set as the bars move forwardly, the bars of one set being alternately disposed with respect to the bars of an adjacent set.

5. A grizzly comprising an endless, combined screening and conveying element having a forwardly traveling upper stretch, a rearwardly traveling lower stretch, a downwardly traveling forward end stretch and an upwardly traveling rear end stretch, said element including simultaneously traveling sets of pivotally supported, spaced screen bars movable to a horizontal position on the forward travel of the upper stretch and to a vertical position on the rearward travel of the lower stretch, lifting arms carried by, bodily moving with and arranged at the sides of each set, and means positioned in proximity to the upper stretch of said element and coacting with said arms for elevating the bars of a forward set in advance of the bars of a rear set as the bars move forwardly, the bars of one set being alternately disposed with respect to the bars of an adjacent set, the bars of one set of a length to extend between the bars of an adjacent set at the upper stretch of said element.

6. A grizzly comprising an endless, combined screening and conveying element having a forwardly traveling upper stretch, a rearwardly traveling lower stretch, a downwardly traveling forward end stretch and an upwardly traveling rearward end stretch, said element further including simultaneously traveling sets of pivotally supported, parallel, spaced screen bars movable to a horizontal position when traveling forwardly and to a vertical position when traveling rearwardly, the bars of one set which is horizontally disposed extending between the bars of the rear set which is horizontally disposed, lifters carried by, traveling over and positioned at the sides of each set, and means coacting with said lifters for intermittently elevating the sets of bars when positioned horizontally as the upper stretch moves forwardly.

7. A grizzly comprising an endless, combined screening and conveying element having a forwardly traveling upper stretch, a rearwardly traveling lower stretch, a downwardly traveling forward end stretch and an upwardly traveling rearward end stretch, said element further including simultaneously traveling sets of upwardly shiftable, spaced agitators movable to a horizontal position when traveling forwardly and to a vertical position when traveling rearwardly, lifters carried by, traveling over and positioned at the sides of each set, and means coacting with said lifters for successively elevating the sets of agitators providing the upper stretch of said element as said upper stretch moves forwardly.

8. A grizzly comprising an endless, combined screening and conveying element having a forwardly traveling upper stretch, a rearwardly traveling lower stretch, a downwardly traveling forward end stretch and an upwardly traveling rearward end stretch, said element further including simultaneously traveling sets of upwardly shiftable, spaced agitators movable to a horizontal position when traveling forwardly and to a vertical position when traveling rearwardly, said agitators being pivotally supported at one end, said element further including lifters at the sides of each set of agitators and traveling therewith, and means coacting with said lifters of the sets of agitators forming the upper stretch for shifting the agitators of a forward set upwardly upon an arc from horizontal position in advance of the shifting of the agitators of a rear set upwardly upon an arc.

In testimony whereof, I affix my signature hereto.

JONAS LIEN.